US011303675B1

(12) United States Patent
Sellers (10) Patent No.: US 11,303,675 B1
(45) Date of Patent: Apr. 12, 2022

(54) CONTAINING COMPROMISED CREDENTIALS USING DECEPTION SYSTEMS

(71) Applicant: Rapid7, Inc., Boston, MA (US)

(72) Inventor: Thomas Eugene Sellers, Georgetown, TX (US)

(73) Assignee: Rapid7 , Inc., Boston, MA (US)

( * ) Notice: Subject to any disclaimer, the term of this patent is extended or adjusted under 35 U.S.C. 154(b) by 302 days.

(21) Appl. No.: 16/368,205

(22) Filed: Mar. 28, 2019

(51) Int. Cl.
  *H04L 9/00* (2022.01)
  *H04L 29/06* (2006.01)
(52) U.S. Cl.
  CPC ...... *H04L 63/1491* (2013.01); *H04L 63/1416* (2013.01)
(58) Field of Classification Search
  CPC .................. H04L 63/1491; H04L 63/1416
  USPC .......................................................... 726/22
  See application file for complete search history.

(56) References Cited

U.S. PATENT DOCUMENTS

| | | | |
|---|---|---|---|
| 10,277,629 B1* | 4/2019 | Guntur | H04L 63/1433 |
| 10,530,787 B2* | 1/2020 | Avrahami | G06F 21/554 |
| 10,574,697 B1* | 2/2020 | McClintock | H04L 63/1491 |
| 11,050,787 B1* | 6/2021 | Sharifi Mehr | H04L 63/1491 |
| 2017/0093910 A1* | 3/2017 | Gukal | H04L 63/1416 |
| 2017/0346830 A1* | 11/2017 | Goldfarb | H04L 63/102 |
| 2018/0103031 A1* | 4/2018 | Niemela | H04L 63/1433 |

* cited by examiner

*Primary Examiner* — Christopher J Brown
(74) *Attorney, Agent, or Firm* — Ashwin Anand (57) ABSTRACT

Disclosed herein are methods, systems, and processes for containing compromised credentials using deception systems. A request to authenticate a credential is received at a honeypot and a determination is made that the request includes context information that correlates the credential with network components that are part of the network. A protected host in the network associated with the credential is identified and the credential is authenticated by validating the credential with the protected host. A determination is made that the credential is compromised and the credential is deactivated.

20 Claims, 9 Drawing Sheets

CONTAINING COMPROMISED CREDENTIALS USING DECEPTION SYSTEMS

BACKGROUND

Field of the Disclosure

This disclosure is related to deception systems implemented in cybersecurity computing environments. In particular, this disclosure is related to containing compromised credentials using deception systems.

Description of the Related Art

Honeypots are security resources implemented in cybersecurity computing environments, to be probed and/or attacked by malicious attackers (e.g., hackers, and the like). Honeypots are deceptive, discoverable, interactive, and can be actively monitored. Honeypots are often configured to mimic protected hosts such as production systems. In most cases, such target systems require authentication before (external) access can be provided and/or gained. Therefore, in a honeypot ecosystem, malicious attackers who are successfully deceived into thinking that a given honeypot is a target system attempt to authenticate with the honeypot by presenting credentials (e.g., a username and a password), that may be valid or invalid, in order to gain access to what they believe is the target system.

Typically, authentication attempts involving honeypots are logged and no secondary action is taken. However, the presentation of legitimate credentials to a honeypot by a malicious attacker for authentication is a high-fidelity indicator of compromise. In such cases, it would be desirable to disable the compromised credentials in a timely manner so that the malicious attacker is prevented from using the compromised credentials elsewhere in the network. Unfortunately, the credentials presented by malicious attackers for authentication can include both plaintext and opaque credentials. While accounts associated with compromised plaintext credentials can be deactivated by validating the plaintext credentials (e.g., using manual log review), validating opaque credentials (e.g., encrypted credentials, hashed credentials, and the like) using honeypots presents a technical challenge.

SUMMARY OF THE DISCLOSURE

Disclosed herein are methods, systems, and processes for containing compromised credentials using deception systems. One such method involves receiving a request to authenticate a credential at a honeypot, determining that the request includes context information that correlates the credential with network components that are part of the network, identifying a protected host in the network associated with the credential, authenticating the credential by validating the credential with the protected host, determining that the credential is compromised, and deactivating the credential.

In one embodiment, the request is received from an attacker and is part of a malicious attack. The context information indicates that the malicious attack is intended by the attacker to be directed against the protected host and deactivating the credential stops lateral movement of the malicious attack in the network.

In some embodiments, the method involves transmitting an alert to other honeypots in the network indicating that the credential has been compromised and transmitting an instruction to the other honeypots to treat the credential as valid as part of the lateral movement of the malicious attack in the network. In other embodiments, the context information includes domain metadata that includes a domain identity associated with one or more domain controllers and/or data to determine a credential store, an authentication mechanism, an application, a host, or another system that the credential was intended to be used against or be valid for.

In certain embodiments, the method involves transmitting a notification to a honeypot management system indicating that the credential has been compromised, a network component of includes a domain, and authenticating and deactivating the credential includes accessing an application programming interface (API) or a custom agent executing on the honeypot.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Honeypots are physical or virtual computing systems implemented in a network as a decoy to lure malicious actors (e.g., hackers) in an attempt to detect, deflect, and/or study hacking attempts. Such deception systems can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

As noted, honeypots are often configured to mimic protected hosts such as production systems. In most cases, such target systems require authentication before (external) access can be provided and/or gained. Therefore, in a honeypot ecosystem, malicious attackers who are successfully deceived into thinking that a given honeypot is a target system attempt to authenticate with the honeypot by presenting credentials (e.g., a username and a password), that may be valid or invalid, in order to gain access to what they believe is the target system.

Typically, in existing honeypot implementations, authentication attempts involving honeypots are logged and often no secondary action is taken. However, because the presentation of legitimate credentials to a honeypot by a malicious attacker for authentication is a high-fidelity indicator of compromise, it is desirable to disable compromised credentials in a timely manner so that the malicious attacker is effectively prevented from using the compromised credentials elsewhere in the network.

Unfortunately, the credentials presented by malicious attackers for authentication can include both plaintext and opaque credentials. While accounts associated with compromised plaintext credentials can be deactivated by validating the plaintext credentials (e.g., using manual log review), validating opaque credentials (e.g., encrypted credentials, hashed credentials, and the like) using honeypots presents a technical challenge, and in some cases is not possible (e.g., due to protocol design, among other reasons). Disclosed herein are methods, systems, and processes for containing compromised credentials using deception systems.

Example Honeypot Credential Validation and Deactivation System

Figure 1:
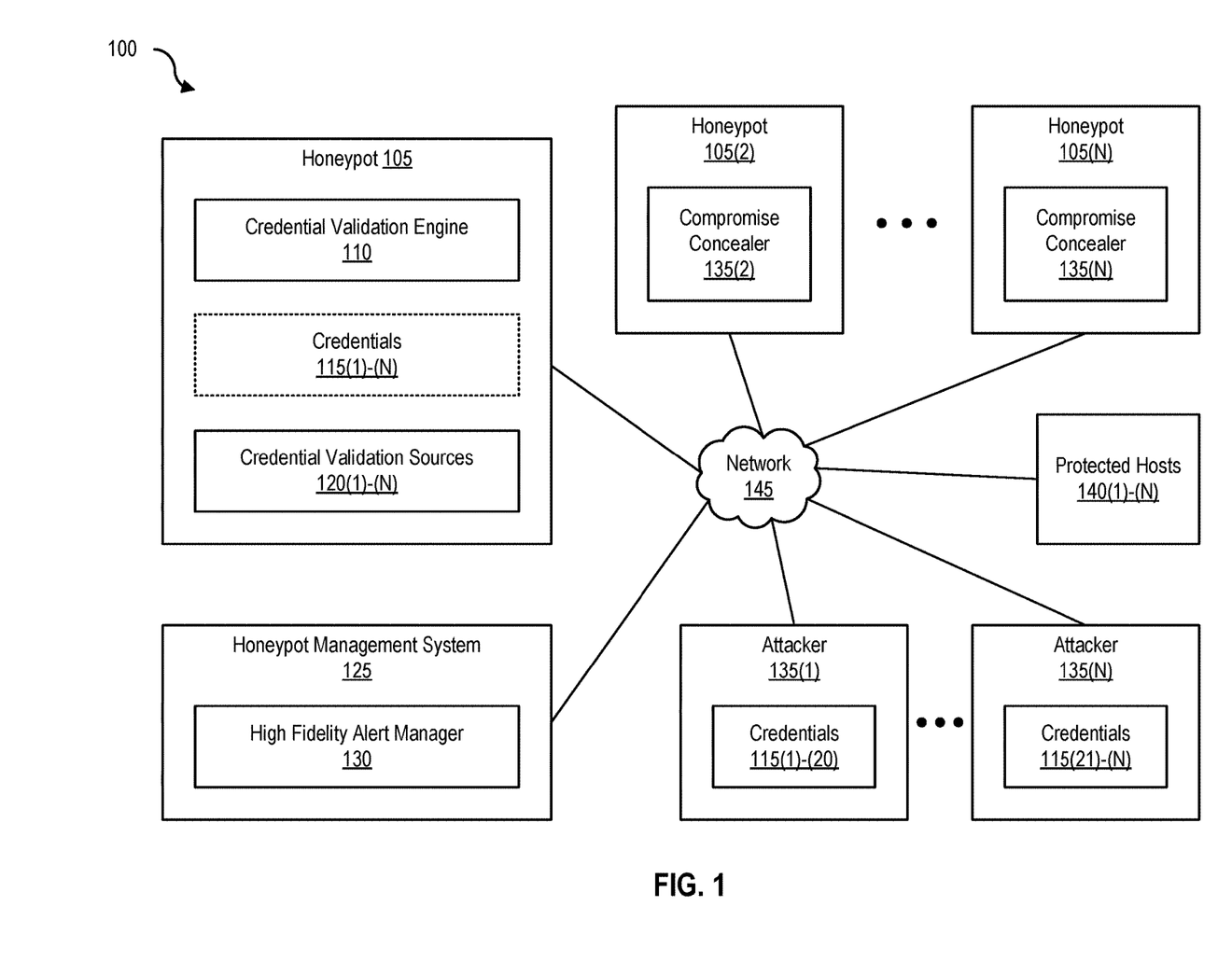
FIG. 1 is a block diagram 100 that illustrates a honeypot credential validation system, according to one embodiment of the present disclosure.

FIG. 1 is a block diagram 100 that illustrates a honeypot credential validation system, according to one embodiment. A honeypot 105 is a physical or virtual computing system that is capable of accepting operating system (OS) and/or application authentication attempts. Honeypot 105 includes at least a credential validation engine 110, credentials 115(1)-(N), and credential validation sources 120(1)-(N). Honeypot 105 is communicatively coupled to other honeypots 105(2)-(N), protected hosts 140(1)-(N), and a honeypot management system 125 via network 145, which can be any type of network and/or interconnection.

Honeypot management system 125 includes a high fidelity alert manager 130 that generates alerts to one or more honeypots that credentials presented by an attacker are legitimate (as determined by credential validation engine 110 implemented by honeypot 105), and thus provides a high-fidelity indicator of compromise. Credentials 115(1)-(N) include one or more opaque credentials presented to honeypot 105 by one or more attackers 135(1)-(N) (e.g., one or more username and password combinations that are encrypted and/or hashed, and are therefore considered opaque credentials).

Honeypots 105(2)-(N) include corresponding compromise concealers 135(2)-(N), respectively. Attackers 135(1)-(N) initiate one or more malicious attacks against one or more protected hosts 140(1)-(N) in network 145. In one embodiment, compromise concealers 135(2)-(N) conceal the compromised nature of opaque credentials that are (or may be) subsequently presented to honeypots 105(2)-(N) by one or more of attackers 135(1)-(N), respectively (e.g., after being determined by honeypot 105 as being legitimate opaque credentials).

In one embodiment, credential validation engine 110 receives a request to authenticate a credential at honeypot 105 (e.g., credential 115(1) which is an opaque credential), determines that the request includes context information that correlates the credential with network components (e.g., domains, and the like) that are part of network 145, identifies a protected host (e.g., protected host 140(1)) in network 145 associated with the credential, and authenticates the credential by validating the credential with the production host (e.g., using one or more of credential validation sources 120(1)-(N)), determines that the credential is compromised, and deactivates the credential.

In some embodiments, the request is received from attacker 135(1) and is part of a malicious attack and the context information (e.g., domain metadata that includes the identity of a domain (e.g., a network component) associated with one or more domain controllers in network 145, and the like) indicates that the malicious attack is intended by attacker 135(1) to be directed against protected host 140(1). In this example, deactivating the credential stops lateral movement of the malicious attack in network 145.

In other embodiments, high fidelity alert manager 130 implemented by honeypot management system 125 transmits an alert to honeypots 105(2)-(N) in network 145 indicating that the credential has been compromised and transmits an instruction to honeypots 105(2)-(N) to treat the credential as valid as part of the lateral movement of the malicious attack in network 145 (e.g., compromise concealers 135(2)-(N) in honeypots 105(2)-(N), respectively, conceal the compromised nature of credential 115(1) such that attacker 135(1) can be deceived into progressing laterally in network 145 although the actual opaque credential presented by the attacker is a legitimate/valid credential).

Figure 2:
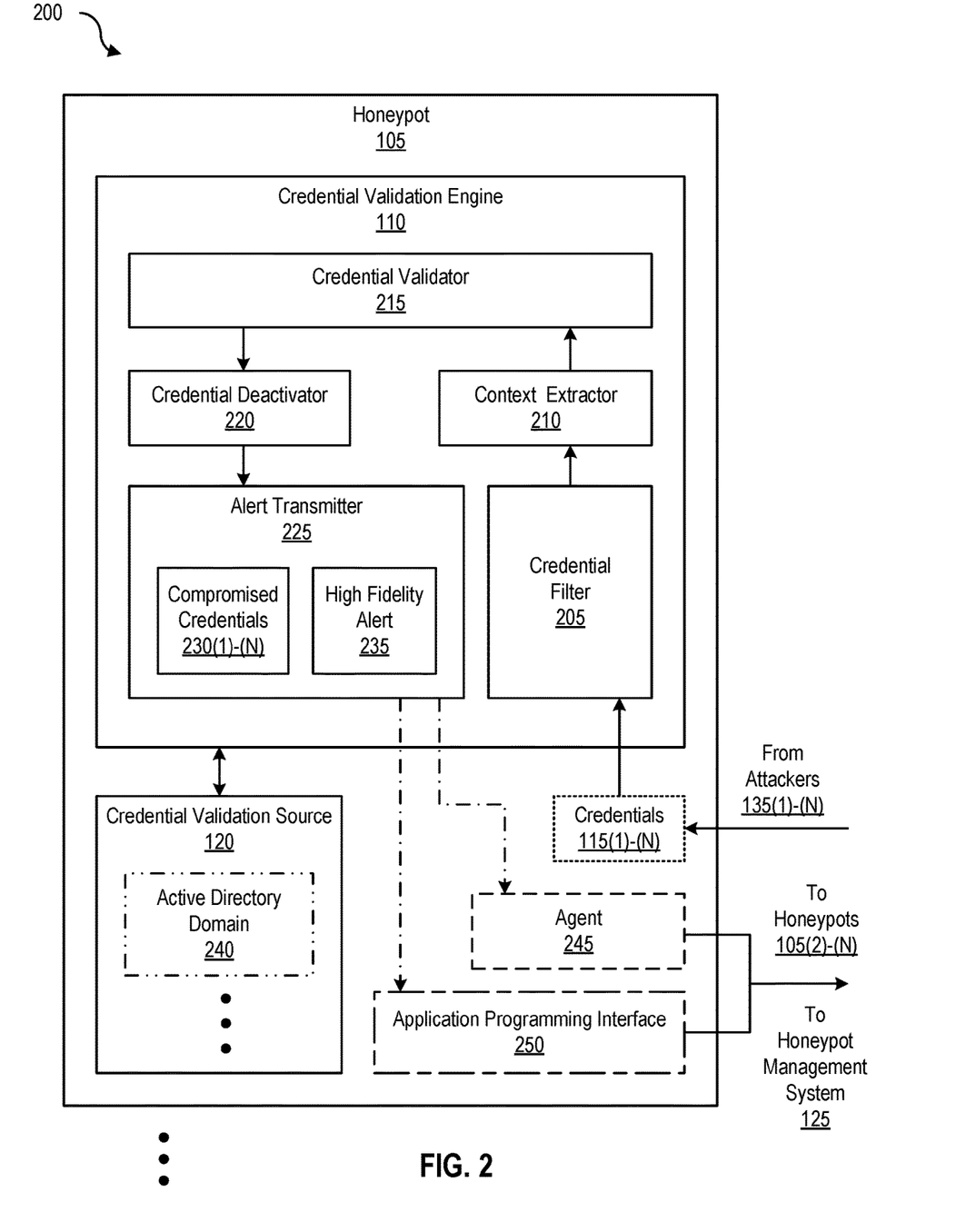
FIG. 2 is a block diagram 200 that illustrates a honeypot that performs credential validation, according to one embodiment of the present disclosure.

FIG. 2 is a block diagram 200 that illustrates a honeypot that performs credential validation, according to one embodiment. Credential validation engine 110, which is implemented by honeypot 105, includes at least a credential filter 205 that filters one or more credentials 115(1)-(N) received from one or more attackers 135(1)-(N), a context extractor 210, a credential validator 215, a credential deactivator 220, and an alert transmitter 225 that maintains compromised credentials 230(1)-(N) and generates a high fidelity alert 235.

Honeypot 105 is configured to accept OS and/or application authentication attempts and performs credential validation and deactivation. As shown in FIG. 2, and in one embodiment, honeypot 105 includes at least credential validation source 120 that validates credentials using an active directory (AD) domain 240 (among other credential validation sources). In this example, authenticating and deactivating credentials includes accessing an Application Programming Interface (API) 250 or a custom agent (e.g., agent 245) executing on honeypot 105, which can send alerts of compromise or instructions for further/future credential treatment (e.g., to treat as valid or invalid), respectively, to honeypot management system 125 and honeypots 105(2)-(N), respectively, as shown in FIG. 2.

In certain embodiments, credential filter 205 filters plain-text and opaque credentials seen by or presented to honeypot 105 (e.g., one or more credentials 115(1)-(N) by one or more attackers 135(1)-(N)) and identifies credentials of concern based on configured or observed information (e.g., based on domain names, and the like). Credential validator 215 leverages agent 245 and/or API 250 to verify the validity of the credentials (e.g., using a credential validation source like AD domain 240). In this example, credential validation engine 110 also provides optional controls to prevent accidental account lockouts or abuse of the system.

Credential deactivator 220 leverages agent 245 and/or API 250 to deactivate one or more credentials and/or takes other security actions required to stop the malicious attacker (e.g., takes certain protected hosts offline). Alert transmitter 225 generates appropriate logging and/or alerting (e.g., high fidelity alert 235) to notify operators (e.g., system administrators) that a high quality signal of an event of concern has occurred (e.g., the presentation of a legitimate credential to a honeypot by a malicious attacker). Optionally, and as shown in FIG. 1, credential validation engine 110 can also notify honeypot management system 125 of the outcome of credential validation (and possible deactivation) so that honeypot management system 125 can take one or more defensive security actions.

As previously noted, credential filter 205 filters credentials seen by or presented to honeypot 105 and identifies credentials of concern based on configured or observed information. Because malicious attackers often use brute force attacks to guess credentials and gain entry to a target protected host (or honeypot), using random brute force dictionaries can cause a lot of noise in the network. In addition, if a malicious attacker attempts to authenticate a honeypot OS share using a domain that is not part of the network, such an attempt is not of concern because there is no risk of the malicious attack succeeding. Therefore, only credentials of concern are filtered by credential filter 205 by using context extractor 210 to extract the context of the credentials that are seen or presented. Such context information can include, but is not limited to, data to determine a credential store, an authentication mechanism, an application, a host, or another system that the seen or presented credential was intended to be used against or be valid for (e.g., network components). Given the importance of the context of the presented credential, context extractor 210 extracts context information of credentials prior to validation and deactivation (if necessary) of those credentials (as shown in FIG. 2).

Examples of Performing Context-Driven Credential Validation at a Honeypot

Figure 3:
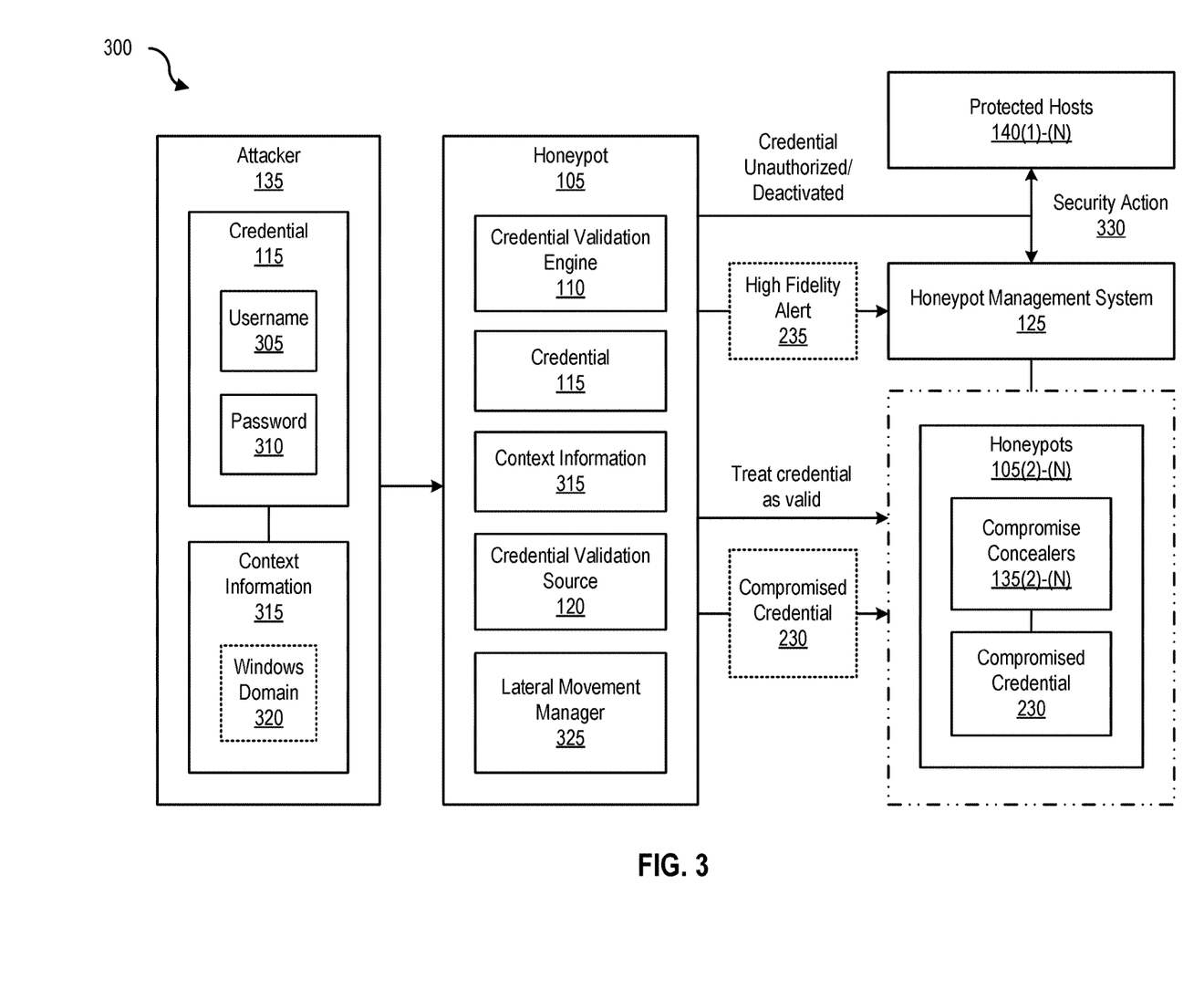
FIG. 3 is a block diagram 300 that illustrates a honeypot that performs credential validation and deactivation, according to one embodiment of the present disclosure.

FIG. 3 is a block diagram 300 that illustrates a honeypot that performs context-driven credential validation and deactivation at a honeypot, according to one embodiment. As shown in FIG. 3, attacker 135 attempts to authenticate credential 115 (e.g., a username 305 and a password 310) with context information 315 (e.g., a windows domain 320) with honeypot 105. As noted, in addition to a Windows domain, context information 315 can include data that can be used to determine a credential store, an authentication mechanism, an application, a host, or another system that the credential was intended to be used against or be valid for.

Honeypot 105 includes credential validation engine 110 which validates credential 115 as being valid or invalid using at least credential validation source 120 (e.g., an AD domain) and context information 315. Because honeypot 105 has context information 315 of the credential extracted by context extractor 210, only credentials that are of concern (e.g., credentials that are associated with one or more network components or network artifacts) are processed by credential validation engine 110. In this manner, extraneous credentials that may be valid but pose no security threat to the network are not processed for validity/invalidity and/or not authenticated (e.g., credentials that are brute forced, credentials that are associated with a domain that is not part of the network, and the like).

In one embodiment, lateral movement manager 325 performs a bifurcated validation and deactivation operation in conjunction with credential deactivator 220 based on the lateral movement of attacker 135. For example, if credential 115 is validated and/or authenticated as being legitimate and context information 315 indicates that credential 115 was intended to be used against a network component or network artifact that is part of the network, credential deactivator 220 deactivates credential 115 for protected hosts 140(1)-(N) and transmits high fidelity alert 235 to honeypot management system 125 to perform a security action 330 (e.g., credential deactivation, among others). As part of the same bifurcated validation and deactivation operation, lateral movement manager 325 transmits instructions to compromise concealers 135(2)-(N) in honeypots 105(2)-(N) to treat credential 115 (which is shown as compromised credential 230 in FIG. 3) as valid (e.g., to further entice the lateral movement of attacker 135 and to gather further attack telemetry data and/or attack intelligence).

In some embodiments, attacker 135 attempts to authenticate to a Server Message Block (SMB) honey service of honeypot 105 with credential 115 for a specific AD domain (e.g., context information 315). In this example, credential 115 is partially opaque because credential 115 includes a username, a domain, and a protocol specific hash, and credential validation engine 110 used by honeypot 105 (or honeypot management system 125) has the AD domain registered as an information source. Credential validation engine 110 determines whether credential 115 is valid by attempting to authenticate via a web application, SMB, custom infrastructure, and the like (e.g., based on context information 315 extracted from the authentication attempt by attacker 135).

In certain embodiments, if credential 115 is found to be valid, credential validation engine 110 (1) uses a pre-configured AD account with Account Operator or the rights to disable accounts to disable the compromised account, (2) logs information related to the event (e.g., the starting point of the compromise, and the like), (3) generates an alert to an operator to notify them that an event of concern has occurred, (4) transmits a notification to honeypot management system 125 that credential 115 was valid so that, if configured to do so, honeypot management system 125 can change how credential 115 is handled by honeypots 105(2)-(N), (5) directly of via an alternate process causes enterprise Virtual Private Network (VPN) concentrators to disconnect any sessions for the compromised user, or (6) directly or via an alternate process causes enterprise wireless infrastructure to disconnect any sessions for the compromised user.

Therefore, the systems of FIGS. 1, 2, and 3 permit a determination that a malicious attacker has access to valid credentials, enable timely security actions to be taken to stop lateral attacker movement, prompt users to make changes to compromised credentials, and pinpoint where the malicious attacker logged in and the exact component that became compromised. Doing so permits an identification of the compromised credential and stops the spread of the compromised credential. In addition to locking out the compromised account(s), other honeypots in the honeypot fleet can be configured to treat the compromised credentials as valid as part of the lateral movement of the malicious attacker permitting extensive attack telemetry data and attack intelligence gathering. In this manner, the malicious use of stolen credentials can be identified and automated actions and alerting can be triggered to generate a high quality signal of compromise to reduce lateral attacker movement. In addition, valid credentials can be implemented in a honeypot fleet to collect in-depth attack telemetry data from lateral attacker movement.

Example Processes to Contain Compromised Credentials Using Honeypots

Figure 4:
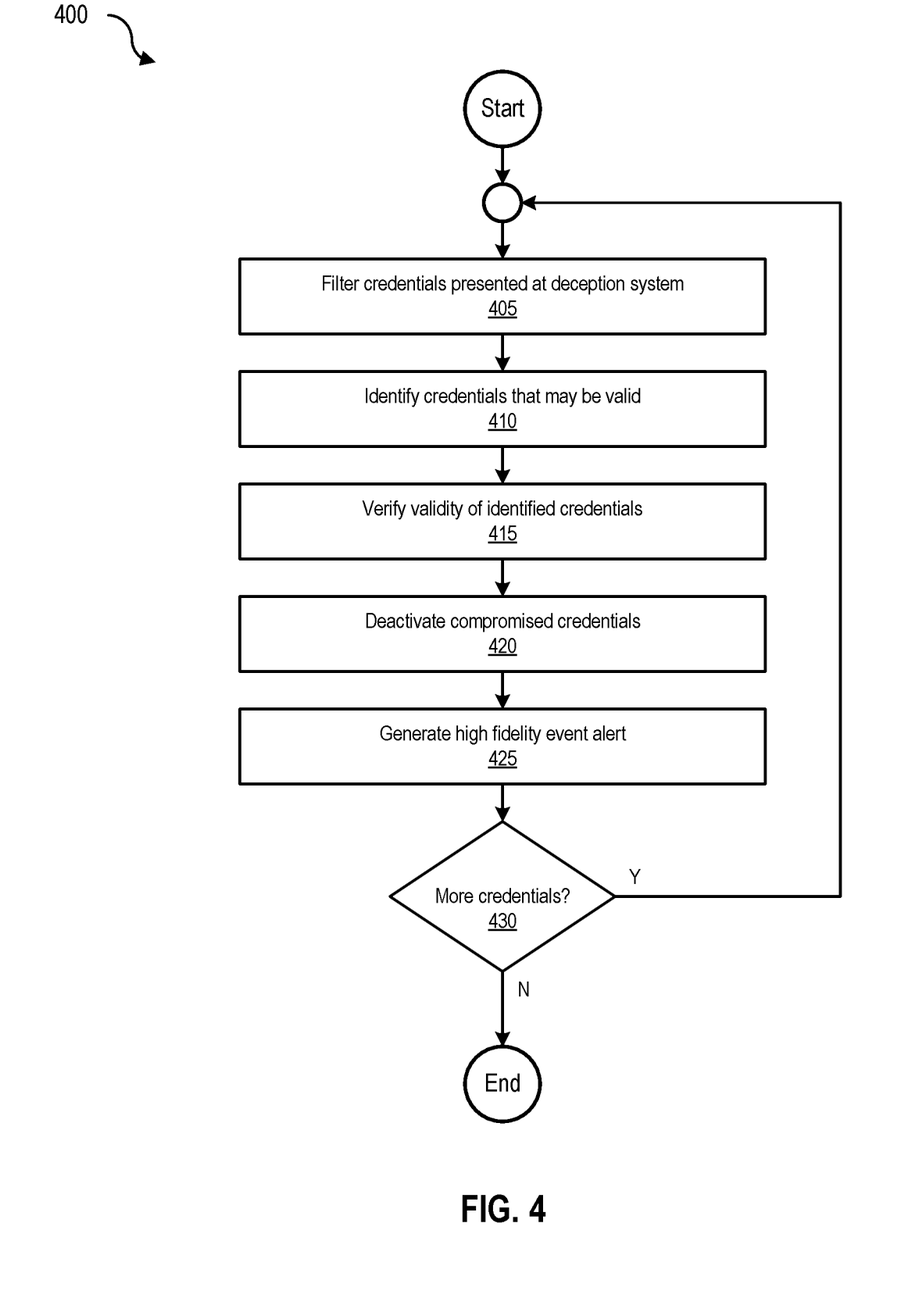
FIG. 4 is a flowchart 400 that illustrates a process for generating a high-fidelity event alert, according to one embodiment of the present disclosure.

FIG. 4 is a flowchart 400 that illustrates a process for generating a high-fidelity event alert, according to one embodiment. The process begins at 405 by filtering credentials presented at a deception system (e.g., using credential filter 205). At 410, the process identifies credentials that may be valid, and at 415, verifies the validity of the identified credentials (e.g., by attempting to authenticate the credentials based on context data associated with the credentials). At 420, the process deactivates compromised credentials, and at 425, generates a high-fidelity event alert. At 430, the process determines if there are more credentials. If there are more credentials, the process loops to 405. Otherwise, the process ends.

Figure 5:
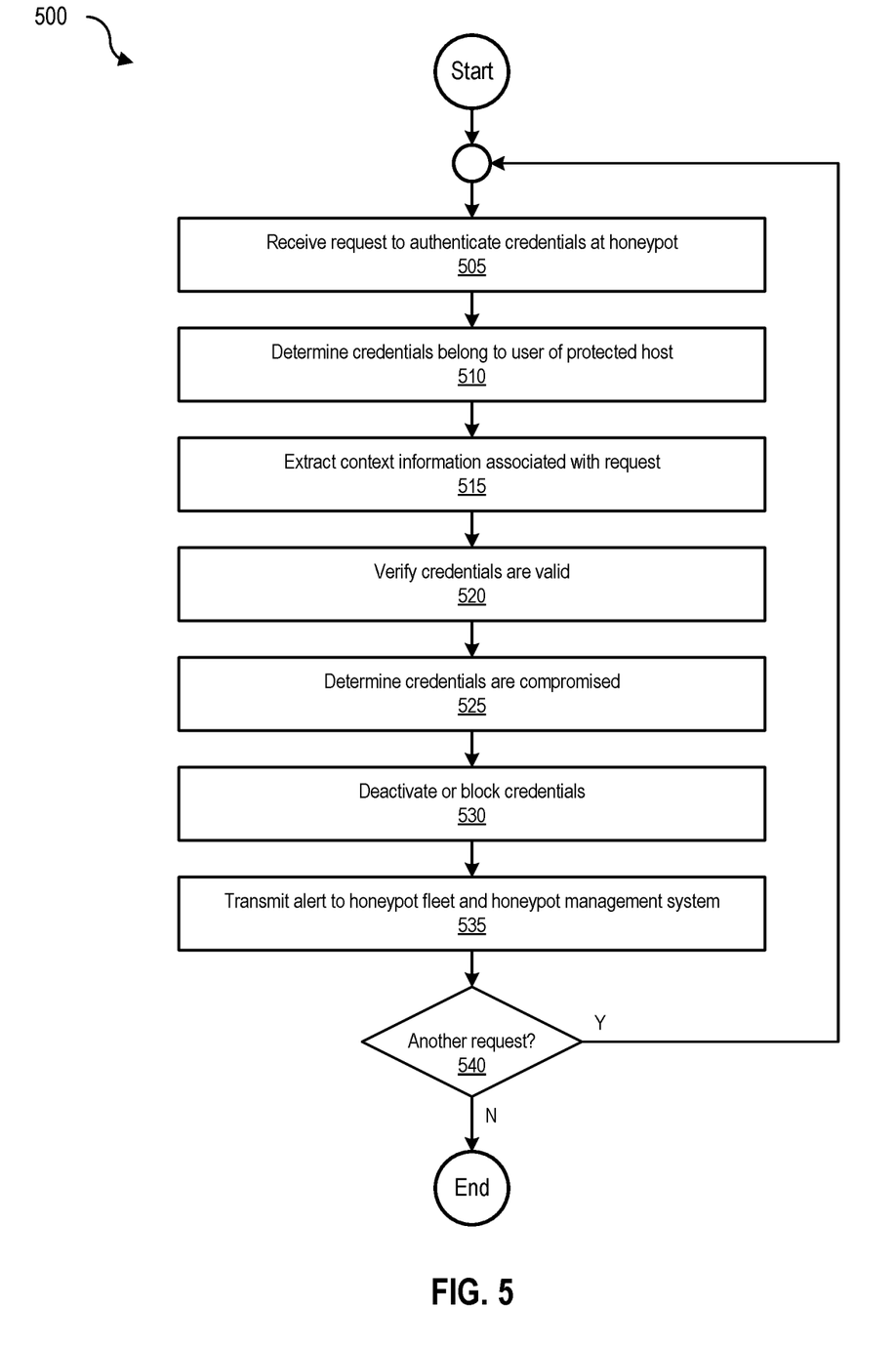
FIG. 5 is a flowchart 500 that illustrates a process for performing credential deactivation, according to one embodiment of the present disclosure.

FIG. 5 is a flowchart 500 that illustrates a process for performing credential deactivation, according to one embodiment. The process begins at 505 by receiving a request to authenticate credentials at a honeypot, and at 510, determines that credentials belong to a user of a protected host (e.g., by querying a credential validation source). At 515, the process extracts context information associated with the request, and at 520, verifies that the credentials are valid. At 525, the process determines that the credentials are compromised, and at 530, deactivates or blocks the credentials. At 535, the process transmits an alert to a honeypot fleet and honeypot management system (e.g., to treat the credentials as valid to facilitate lateral attacker movement with valid credentials). At 640, the process determines if there is another request. If there is another request, the process loops to 505. Otherwise, the process ends.

Figure 6:
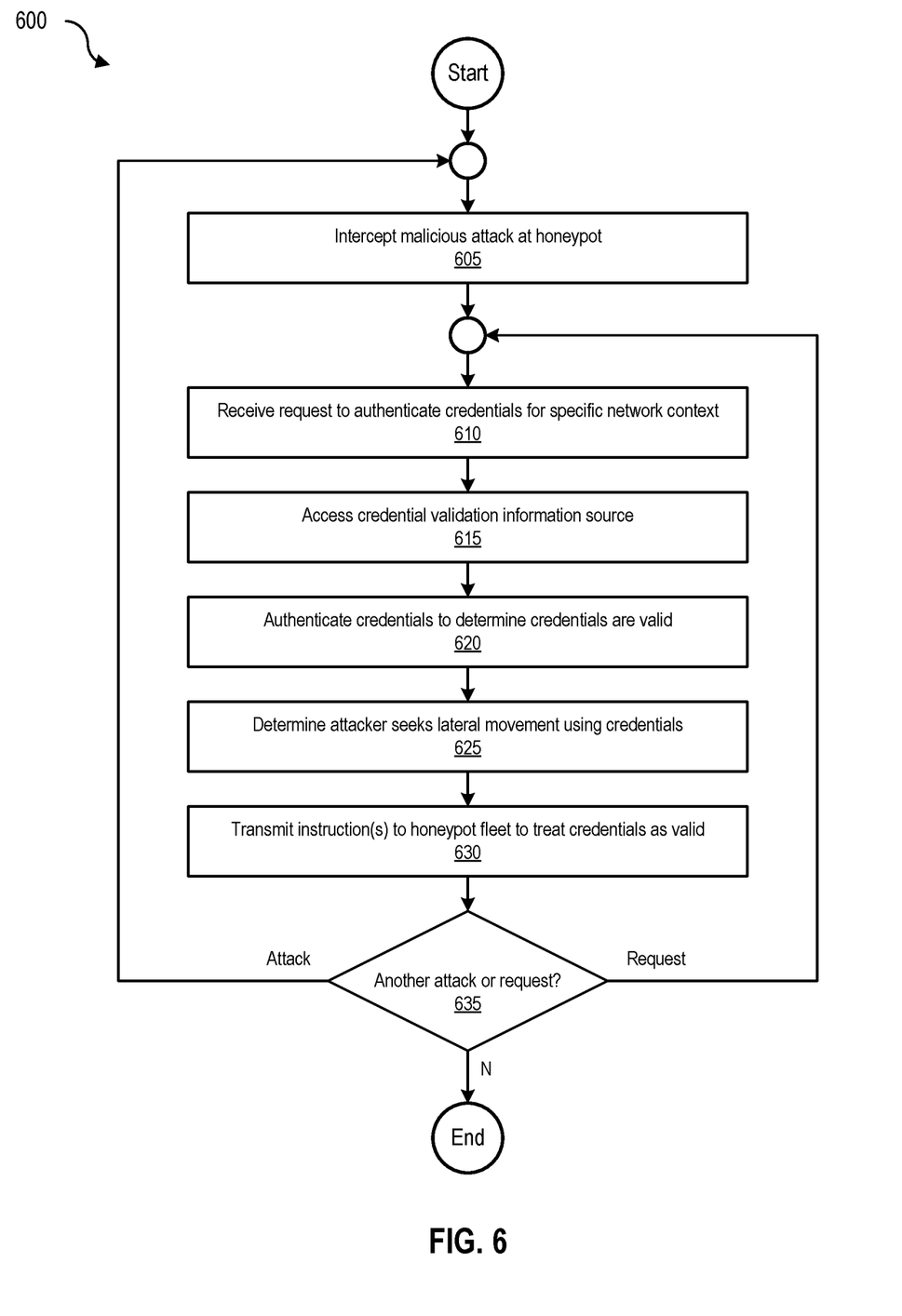
FIG. 6 is a flowchart 600 that illustrates a process for treating compromised credentials as valid, according to one embodiment of the present disclosure.

FIG. 6 is a flowchart 600 that illustrates a process for treating compromised credentials as valid, according to one embodiment. The process begins at 605 by intercepting a malicious attack at a honeypot. At 610, the process receives a request to authenticate credentials for a specific network context (e.g., a domain, an application, and the like). At 615, the process accesses a credential validation information source, and at 620, authenticates the credentials to determine that the credentials are valid (e.g., by authenticating via a web application, and the like). At 625, the process determines that the attacker seeks lateral movement using the credentials, and at 630, transmits instruction(s) to a honeypot fleet to treat credentials as valid. At 635, the process determines if there is another attack or request. If there is another attack, the process loops to 605 or if there is another request, the process loops to 610. Otherwise, the process ends.

Figure 7:
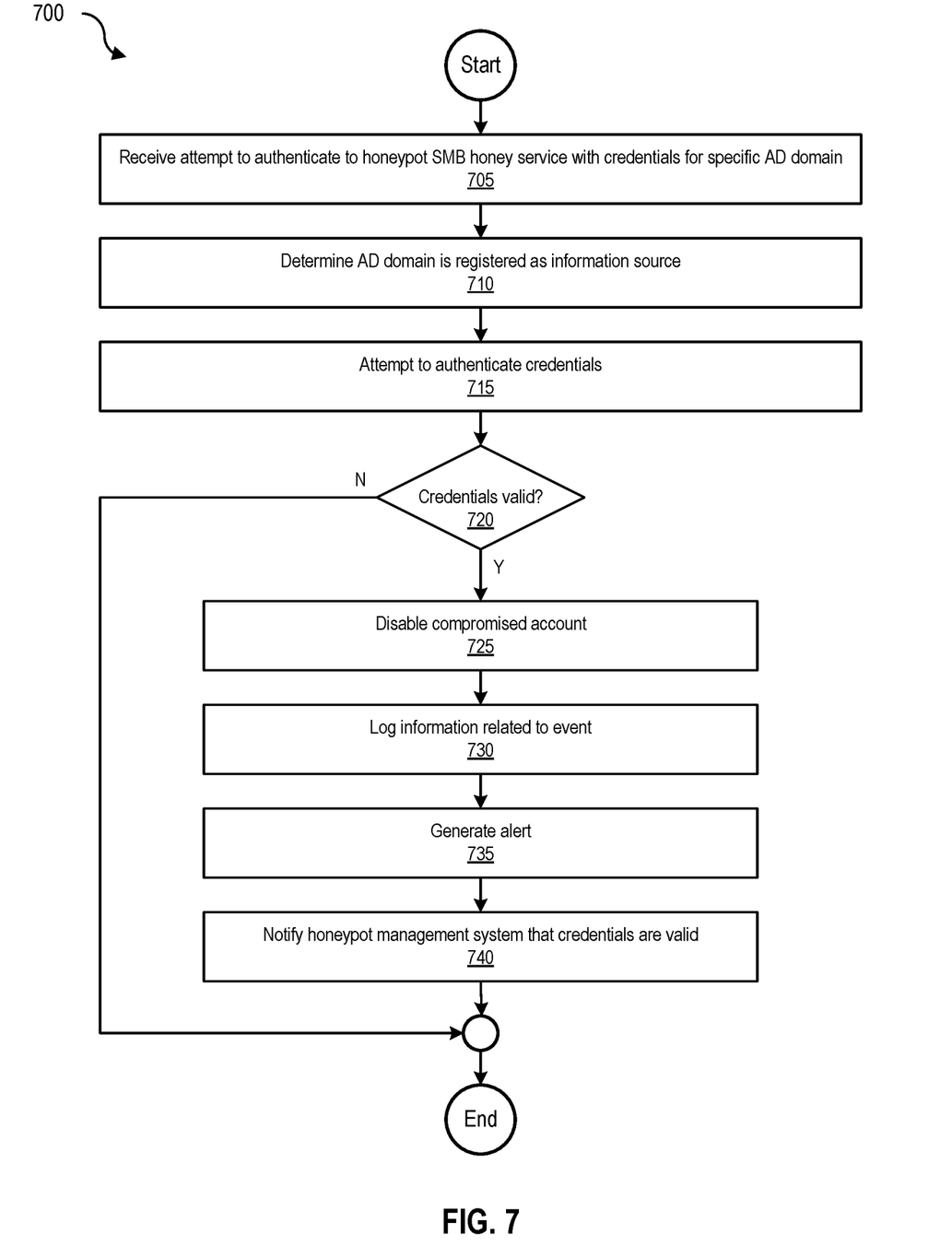
FIG. 7 is a flowchart 700 that illustrates a process for notifying a honeypot management system, according to one embodiment of the present disclosure.

FIG. 7 is a flowchart 700 that illustrates a process for notifying a honeypot management system, according to one embodiment. The process begins at 705 by receiving an attempt to authenticate a honeypot SMB honey service with credentials for a specific AD domain. At 710, the process determines that the AD domain is registered as an information source, and at 715, attempts to authenticate the credentials (e.g., via a web application, SMB, custom infrastructure, and the like). At 720, the process determines whether the credentials are valid. If the credentials are invalid, the process ends. However, if the credentials are valid, the process, at 725, disables the compromised account, and at 730, logs information related to the (attack) event. At 735, the process generates an alert and ends at 740 by notifying a honeypot management system that the credentials are valid.

Example Computing Environment

Figure 8:
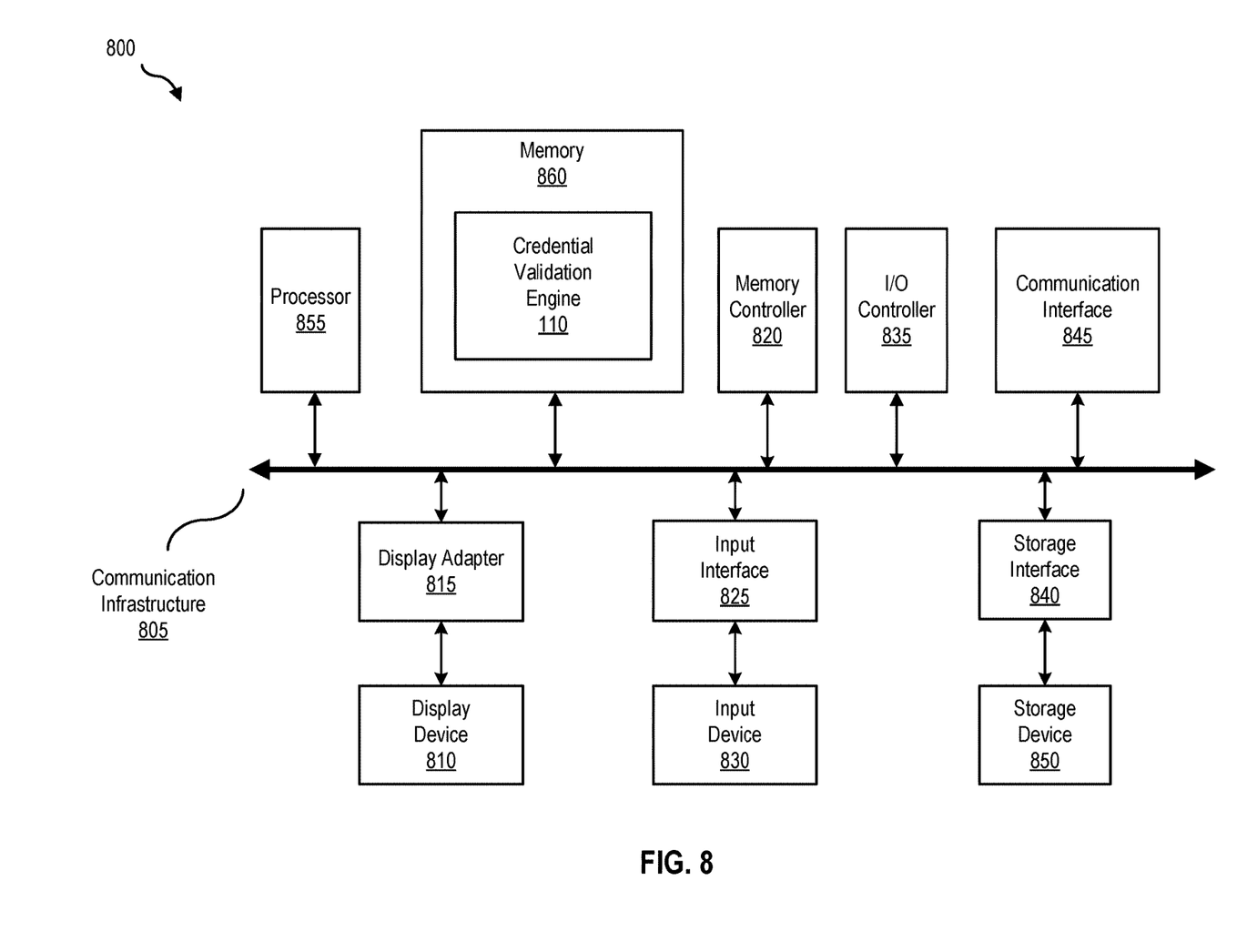
FIG. 8 is a block diagram 800 of a computing system, illustrating how a credential validation engine can be implemented in software, according to one embodiment of the present disclosure.

FIG. 8 is a block diagram 800 of a computing system, illustrating how a credential validation engine 110 can be implemented in software, according to one embodiment. Computing system 800 can include honeypot management system 125 or a computing device provisioning or implementing honeypot 105 and broadly represents any single or multi-processor computing device or system capable of executing computer-readable instructions. Examples of computing system 800 include, without limitation, any of one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes credential validation engine 110, computing system 800 becomes a special purpose computing device that is configured to facilitate the containment of compromised credentials using deceptions systems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing credential validation engine 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware. As noted, computing system 800 can be a physical machine (physical computing device) that supports and provisions a virtual machine in the form of honeypot 105.

Example Networking Environment

Figure 9:
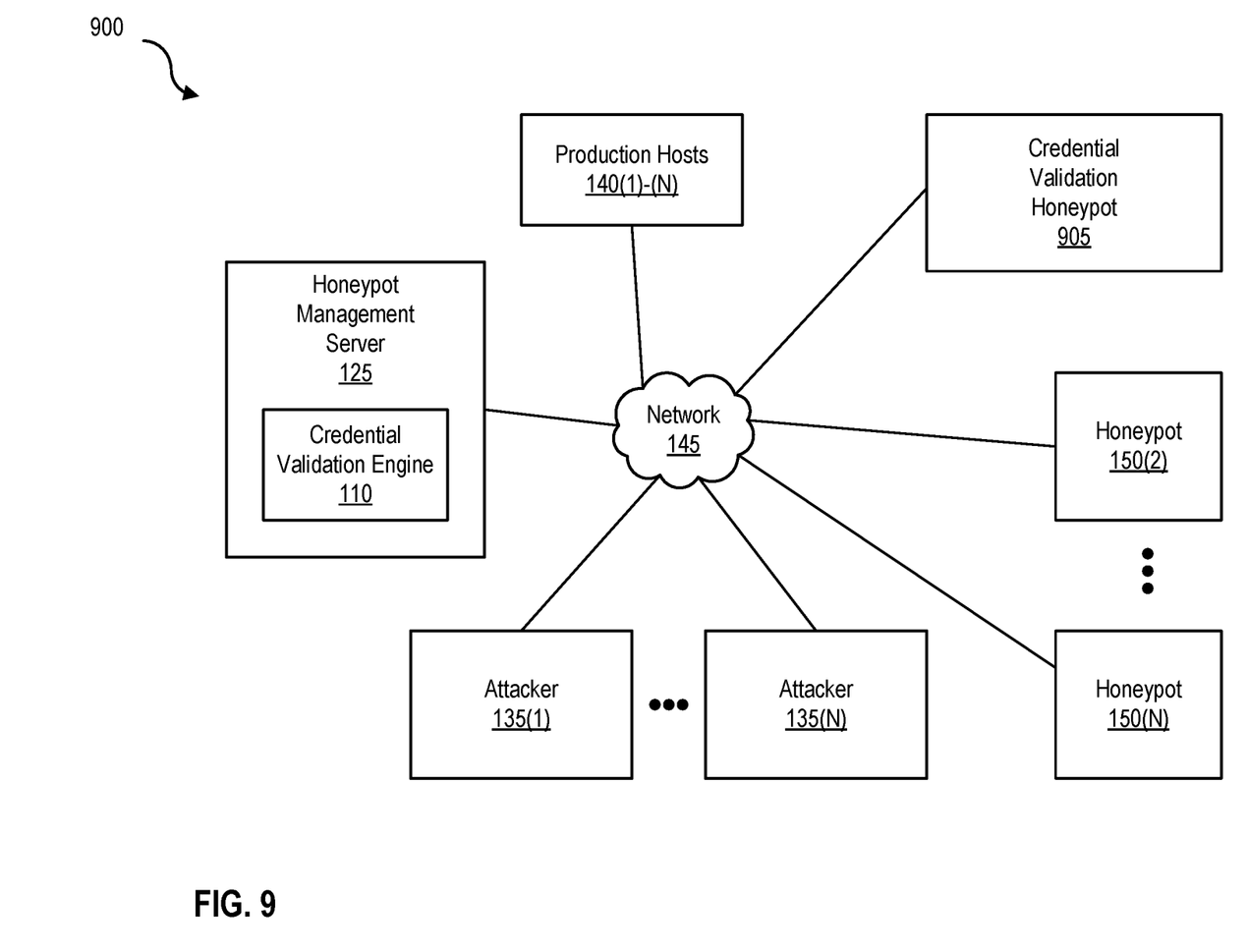
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 145 generally represents any type or form of computer network or architecture capable of facilitating communication between honeypot 105, honeypot management system 125, and honeypots 105(2)-(N). For example, network 145 can be a Wide Area Network (WAN) (e.g., the Internet) or a Local Area Network (LAN). In certain embodiments, a communication interface, such as communication interface 845 in FIG. 8, may be used to provide connectivity between honeypot 105, honeypot management system 125, and honeypots 105(2)-(N), and network 145. The embodiments described herein are not limited to the Internet or any particular network-based environment.

In some embodiments, credential validation engine 110 may be part of honeypot management server 125, or may be separate. In one embodiment, all or a portion of one or more of the disclosed embodiments may be encoded as a computer program and loaded onto and executed by honeypot 105 or honeypot management system 125, or any combination thereof, and may be stored on honeypot 105 and/or honeypot management system 125, and distributed over network 145. In some examples, all or a portion of honeypot 105, honeypots 105(2)-(N), and honeypot management system 125 may represent portions of a cloud-computing or network-based environment that may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. Credential validation engine 110 may transform the behavior of honeypot 105 or honeypot management system 125 to contain compromised credentials using deception systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
receiving, at a honeypot, a request to authenticate an opaque credential, wherein the honeypot is part of a honeypot fleet implemented in a network;
determining that the request comprises context information, wherein the context information correlates the opaque credential with one or more network components that are part of the network;
identifying a protected host of one or more protected hosts in the network associated with the opaque credential;
authenticating the opaque credential by validating the opaque credential with the protected host based on the context information;
determining, by the honeypot and based on the validating of the opaque credential with the protected host, that the opaque credential is compromised, and in response:
logging an alert indicating a presentation of a legitimate credential to the honeypot in association with an attack;
concealing the compromise of the opaque credential;
deactivating the opaque credential in the network; and
transmitting one or more instructions to one or more other honeypots in the honeypot fleet to (a) treat the opaque credential as valid and (b) gather attack telemetry data from a lateral movement associated with the attack, the attack telemetry data comprising one or more attack mechanisms used by the attack and one or more targets sought by the attack.

2. The computer-implemented method of claim 1, wherein
the request is received from an attacker,
the request is part of the attack, and
the context information indicates that the attack is directed against the protected host.

3. The computer-implemented method of claim 2, further comprising:

transmitting another alert to one or more other honeypots in the network indicating that the opaque credential has been compromised; and
transmitting an instruction to the one or more other honeypots to treat the opaque credential as valid as part of the lateral movement of the attack.

4. The computer-implemented method of claim 1, wherein
the context information comprises domain metadata, and
the domain metadata comprises at least one domain identity, and
the at least one domain identity is associated with one or more domain controllers.

5. The computer-implemented method of claim 1, further comprising:
transmitting a notification to a honeypot management system indicating that the opaque credential has been compromised.

6. The computer-implemented method of claim 1, wherein
a network component of the one or more network components comprises a domain.

7. The computer-implemented method of claim 2, wherein
authenticating and deactivating the opaque credential comprises accessing an application programming interface (API) or a custom agent executing on the honeypot.

8. The computer-implemented method of claim 1, wherein
the context information comprises data to determine a credential store, an authentication mechanism, an application, a host, or another system that the opaque credential was intended to be used against or be valid for.

9. A non-transitory computer readable storage medium comprising program instructions executable to:
receive, at a honeypot, a request to authenticate an opaque credential, wherein the honeypot is part of a honeypot fleet implemented in a network;
determine that the request comprises context information, wherein the context information correlates the opaque credential with one or more network components that are part of the network;
identify a protected host of one or more protected hosts in the network associated with the opaque credential;
authenticate the opaque credential by validating the credential with the protected host based on the context information;
determine, by the honeypot and based on the validating of the opaque credential with the protected host, that the opaque credential is compromised, and in response to:
log an alert indicating a presentation of a legitimate credential to the honeypot in association with an attack;
conceal the compromise of the opaque credential;
deactivate the opaque credential in the network; and
transmit one or more instructions to one or more other honeypots in the honeypot fleet to (a) treat the opaque credential as valid and (b) gather attack telemetry data from a lateral movement associated with the attack, the attack telemetry data comprising one or more attack mechanisms used by the attack and one or more targets sought by the attack.

10. The non-transitory computer readable storage medium of claim 9, wherein
the request is received from an attacker,
the request is part of the attack, the context information indicates that the attack is directed against the protected host, the context information comprises domain metadata, the domain metadata comprises at least one domain identity, and the at least one domain identity is associated with one or more domain controllers.

11. The non-transitory computer readable storage medium of claim 10, further comprising:

transmitting another alert to one or more other honeypots in the network indicating that the opaque credential has been compromised;

transmitting an instruction to the one or more other honeypots to treat the opaque credential as valid as part of the lateral movement of the attack; and transmitting a notification to a honeypot management system indicating that the opaque credential has been compromised.

12. The non-transitory computer readable storage medium of claim 9, wherein a network component of the one or more network components comprises a domain.

13. The non-transitory computer readable storage medium of claim 10, wherein authenticating and deactivating the opaque credential comprises accessing an application programming interface (API) or a custom agent executing on the honeypot.

14. The non-transitory computer readable storage medium of claim 9, wherein the context information comprises data to determine a credential store, an authentication mechanism, an application, a host, or another system that the opaque credential was intended to be used against or be valid for.

15. A system comprising:

one or more processors; and a memory coupled to the one or more processors, wherein the memory stores program instructions executable by the one or more processors to:

receive, at a honeypot, a request to authenticate an opaque credential, wherein the honeypot is part of a honeypot fleet implemented in a network;

determine that the request comprises context information, wherein the context information correlates the opaque credential with one or more network components that are part of the network;

identify a protected host of one or more protected hosts in the network associated with the opaque credential;

authenticate the opaque credential by validating the credential with the protected host based on the context information;

determine, by the honeypot and based on the validating of the opaque credential with the protected host, that the opaque credential is compromised, and in response: log an alert indicating a presentation of a legitimate credential to the honeypot in association with an attack;

conceal the compromise of the opaque credential;

deactivate the opaque credential in the network; and transmit one or more instructions to one or more other honeypots in the honeypot fleet to (a) treat the opaque credential as valid and (b) gather attack telemetry data from a lateral movement associated with the attack, the attack telemetry data comprising one or more attack mechanisms used by the attack and one or more targets sought by the attack.

16. The system of claim 15, wherein the request is received from an attacker, the request is part of the attack, the context information indicates that the attack is directed against the protected host, the context information comprises domain metadata, the domain metadata comprises at least one domain identity, and the at least one domain identity is associated with one or more domain controllers.

17. The system of claim 16, the program instructions are executable by the one or more processors to:

transmitting another alert to one or more other honeypots in the network indicating that the opaque credential has been compromised;

transmitting an instruction to the one or more other honeypots to treat the opaque credential as valid as part of the lateral movement of the attack; and transmitting a notification to a honeypot management system indicating that the credential has been compromised.

18. The system of claim 15, wherein a network component of the one or more network components comprises a domain.

19. The system of claim 16, wherein, to authenticate and deactivate the opaque credential, the program instructions are executable by the one or more processors to accessing an application programming interface (API) or a custom agent executing on the honeypot.

20. The system of claim 15, wherein the context information comprises data to determine a credential store, an authentication mechanism, an application, a host, or another system that the opaque credential was intended to be used against or be valid for.

* * * * *